(12) United States Patent
Ortmann

(10) Patent No.: US 6,361,073 B1
(45) Date of Patent: Mar. 26, 2002

(54) AIRBAG AND AIRBAG MODULE FOR A FRONT PASSENGER

(75) Inventor: Sven Ortmann, Fredersdorf (DE)

(73) Assignee: Takata-Petri AG, Aschaffenberg (DE)

( * ) Notice: Subject to any disclaimer, the term of this patent is extended or adjusted under 35 U.S.C. 154(b) by 0 days.

(21) Appl. No.: 09/623,837

(22) PCT Filed: Mar. 5, 1999

(86) PCT No.: PCT/DE99/00684

§ 371 Date: Sep. 8, 2000

§ 102(e) Date: Sep. 8, 2000

(87) PCT Pub. No.: WO99/46149

PCT Pub. Date: Sep. 16, 1999

(30) Foreign Application Priority Data

Mar. 9, 1998 (DE) .................................... 298 04 611 U

(51) Int. Cl.[7] .............................................. B60R 21/16
(52) U.S. Cl. .................................................. 280/743.1
(58) Field of Search .......................... 280/728.1, 730.1, 280/732, 743.1

(56) References Cited

U.S. PATENT DOCUMENTS

| | | | | |
|---|---|---|---|---|
| 5,310,216 A | * | 5/1994 | Wehner et al. | 280/743.1 |
| 5,316,337 A | * | 5/1994 | Yamaji et al. | 280/743.1 |
| 5,454,594 A | | 10/1995 | Krickl | 280/743.1 |
| 5,529,340 A | | 6/1996 | Fairbanks | 280/43.1 |
| 5,632,506 A | | 5/1997 | Shellabarger | 280/743.1 |
| 5,664,805 A | | 9/1997 | Yoshida et al. | 280/743.1 |
| 5,782,488 A | * | 7/1998 | Lewis et al. | 280/743.1 |
| 5,836,612 A | | 11/1998 | Lang | 280/743.1 |
| 5,975,571 A | * | 11/1999 | Ford et al. | 280/743.1 |
| 6,129,382 A | * | 10/2000 | Tonooka | 280/743.1 |

FOREIGN PATENT DOCUMENTS

| | | |
|---|---|---|
| DE | 43 14 347 | 11/1994 |
| DE | 295 10 775 | 10/1995 |
| DE | 195 21 071 | 12/1995 |
| JP | 04135940 | 11/1992 |
| WO | WO94/10008 | 5/1994 |

* cited by examiner

Primary Examiner—Paul N. Dickson
Assistant Examiner—Faye M. Fleming
(74) Attorney, Agent, or Firm—Foley & Lardner

(57) ABSTRACT

An airbag module for a front includes an airbag made of a single, cut-out piece, which on either side of a symmetry axis (1) has an airbag section of identical shape and size. The airbag is arranged in the airbag module so that after the airbag has unfolded following a crash, the seam joining the curved edges (2a, 2b) of the airbag section (2, 3) extends away from the passenger along an at least substantially vertical plane, starting from a seamless area of the airbag and that the seamless area of the airbag, whose length is determined by the symmetry axis (1), faces toward the passenger. In addition, the airbag is folded only once along a symmetry axis (1). A further section (4, 5) is joined to each airbag section (2, 3) so as to form a space for receiving a diffuser.

10 Claims, 3 Drawing Sheets

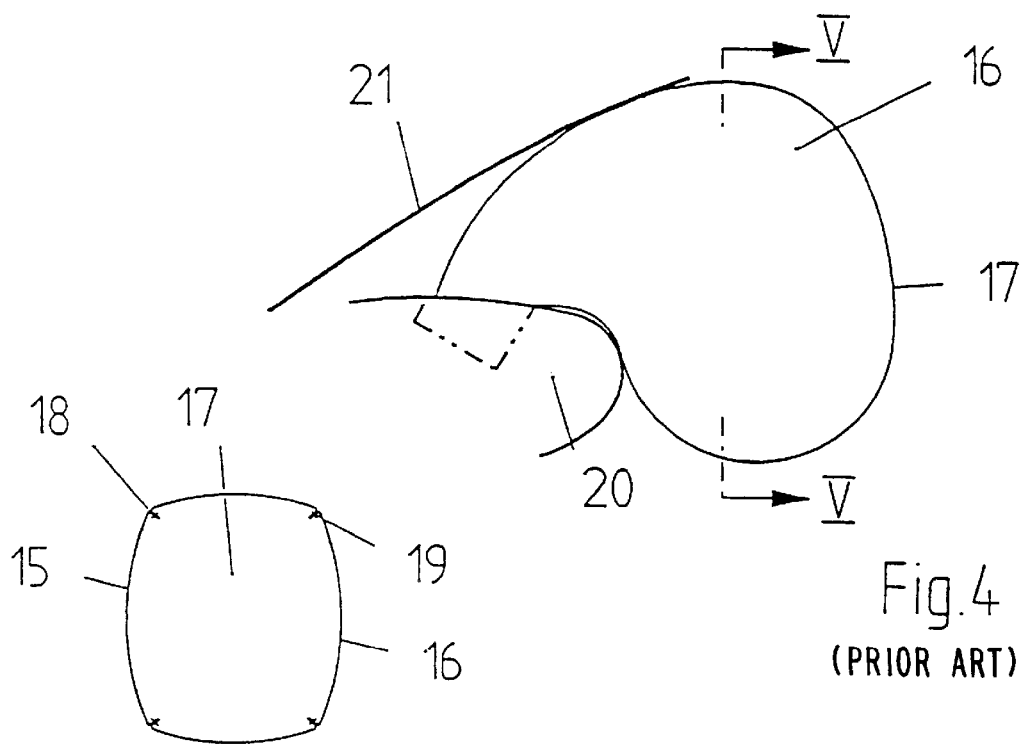
Fig.4 (PRIOR ART)
Fig.5 (PRIOR ART)
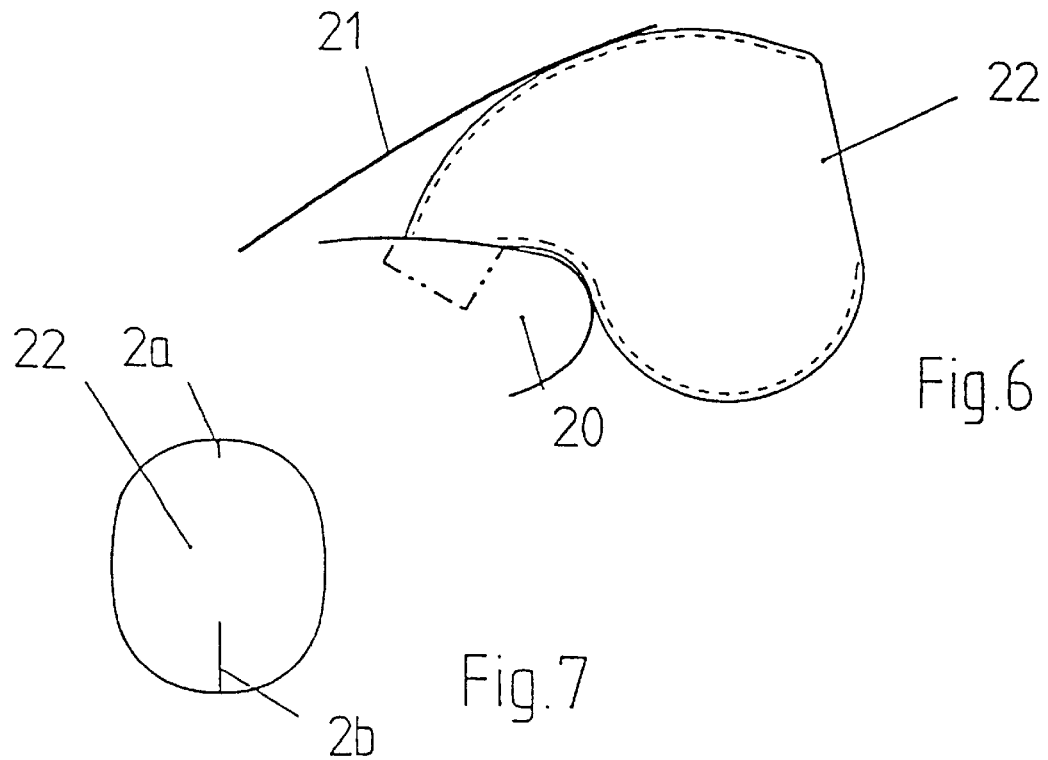
Fig.6
Fig.7

AIRBAG AND AIRBAG MODULE FOR A FRONT PASSENGER

BACKGROUND

A front-passenger airbag modules having airbags produced from a single, flat blank are known. PCT application WO 94/10008 describes an airbag consisting of a blank having a rectangular section, which is adjoined, on opposite sides, by trapezoidal sections of identical size. These sections are adjoined to smaller, rectangular sections. The rectangular sections are intended for connecting the airbag to a tubular gas generator. During production of the airbag, part of the blank is folded around a central line, so that identical parts lie one on the other. The oblique side edges of the trapezoidal section are then sewn together. After that, the upper and lower parts are pulled away from each other perpendicularly with respect to the plane of deployment of the airbag blank. The edges of the opposite surface formed in the process, which run perpendicularly to the plane of deployment, are sewn together. A tubular gas generator is positioned between the airbag sections and fastened thereto so that its longitudinal axis runs parallel to the plane of deployment of the airbag blank.

The airbag is installed in the motor vehicle with its seams running in the lateral region of the airbag, so that the head and chest regions of the occupant do not come into contact with the seams. This is desirable, since there is an increased risk of injury when the occupant impacts against the seam.

The same effect is obtained using an airbag module disclosed in German patent publication DE 295 10 775 U1, which discloses an airbag produced from a single, flat blank having an airbag section of identical shape and size on both sides of a line of symmetry. Furthermore, the airbag has a blow-in opening that is arranged in the airbag module so that after the airbag has unfolded following a crash, the seam connecting the edges of the airbag sections runs away from the occupant along an approximately vertical plane, starting from a seamless region of the airbag.

The known airbag modules have a disadvantage in that it is not possible to sew up their single-piece airbags in one procedure, since the assignment of the airbag sections has to be changed between the sewing procedures. The invention overcomes this disadvantage.

SUMMARY OF THE INVENTION

The present invention relates to an airbag module having a single-piece airbag of a simpler design.

The airbag module according to the invention can be a front-passenger airbag module. The airbag thereof is made of a single, flat blank having an airbag section of identical shape and size on both sides of a line of symmetry. The airbag is arranged in the airbag module so that, after the airbag has unfolded following a crash, the seam connecting the edges of the airbag sections runs away from the occupant along an at least approximately vertical plane, starting from a seamless region of the airbag, and the seamless region of the airbag, whose length is determined by the line of symmetry, faces the occupant. Furthermore, the airbag is only folded once along a line of symmetry. A further section adjoins each airbag section to form a holder for a diffuser.

This arrangement has the advantage in that the single-piece airbag blank, after having been folded around the line of symmetry, as a result of which identically sized parts then lie one above the other, can be sewn along its edges in one procedure to form an airbag, i.e., without the airbag having to be folded into another position. A further advantage, which has been determined in tests, is that this two-dimensional airbag, which is arranged in the airbag module in the manner according to the invention, unfolds following a crash in the same manner as a substantially more complicated three-dimensional airbag.

It is also ensured in the case of this airbag module that the head region and to the greatest possible extent also the chest region of the occupant collide with the seamless region of the unfolded airbag.

A tubular gas generator is preferably provided as the gas generator in the airbag module. A diffuser, which surrounds the tubular gas generator, is arranged so that its longitudinal axis runs perpendicularly with respect to the plane in which the airbag deploys.

In a preferred embodiment, the section for forming a holder for the diffuser is provided in that region of the airbag situated at the top in the installed state. This embodiment is expedient for a "top-mounted" installation position of the airbag module. The airbag, when it unfolds, extends to a lesser extent in the direction of the windshield than in the direction of the occupant.

In a further refinement, provision is made for the edges of the airbag to run in a curved manner.

BRIEF DESCRIPTION OF THE DRAWINGS

The invention will be explained in more detail in an exemplary embodiment with reference to drawings, in which:

FIG. 4 shows a known three-dimensional airbag of a front-passenger airbag module in the unfolded position in the motor vehicle;

FIG. 5 shows the airbag taken along line V—V of FIG. 4 in a scaled-down illustration;

FIG. 6 shows the airbag, designed and arranged according to the invention, of a front-passenger airbag module in the unfolded position in the motor vehicle;

FIG. 7 shows the airbag according to FIG. 6 in section in a scaled-down illustration.

DETAILED DESCRIPTION

Figure 1:
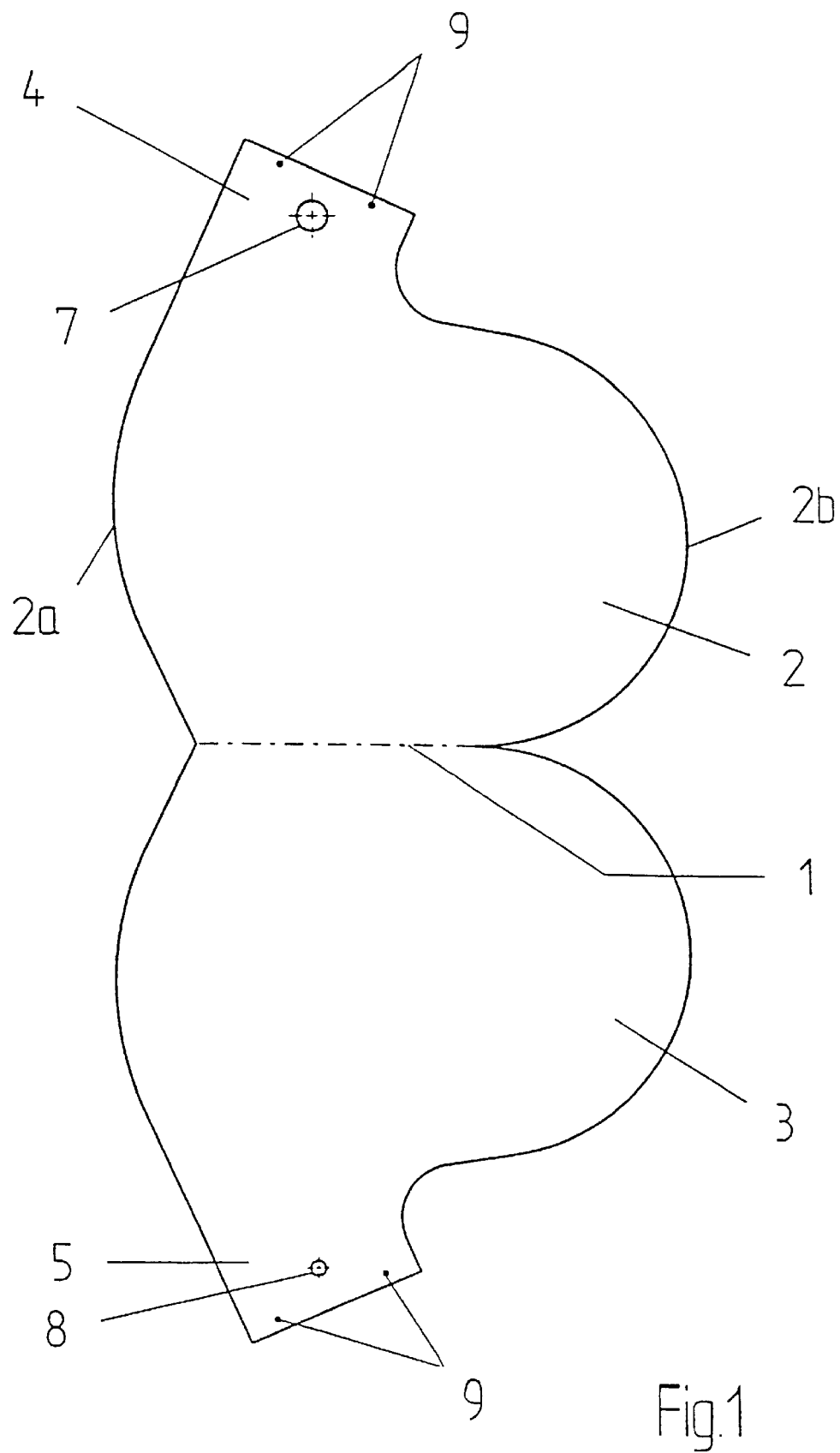
FIG. 1 shows a single-piece airbag blank for a front-passenger airbag module.
Figure 2:
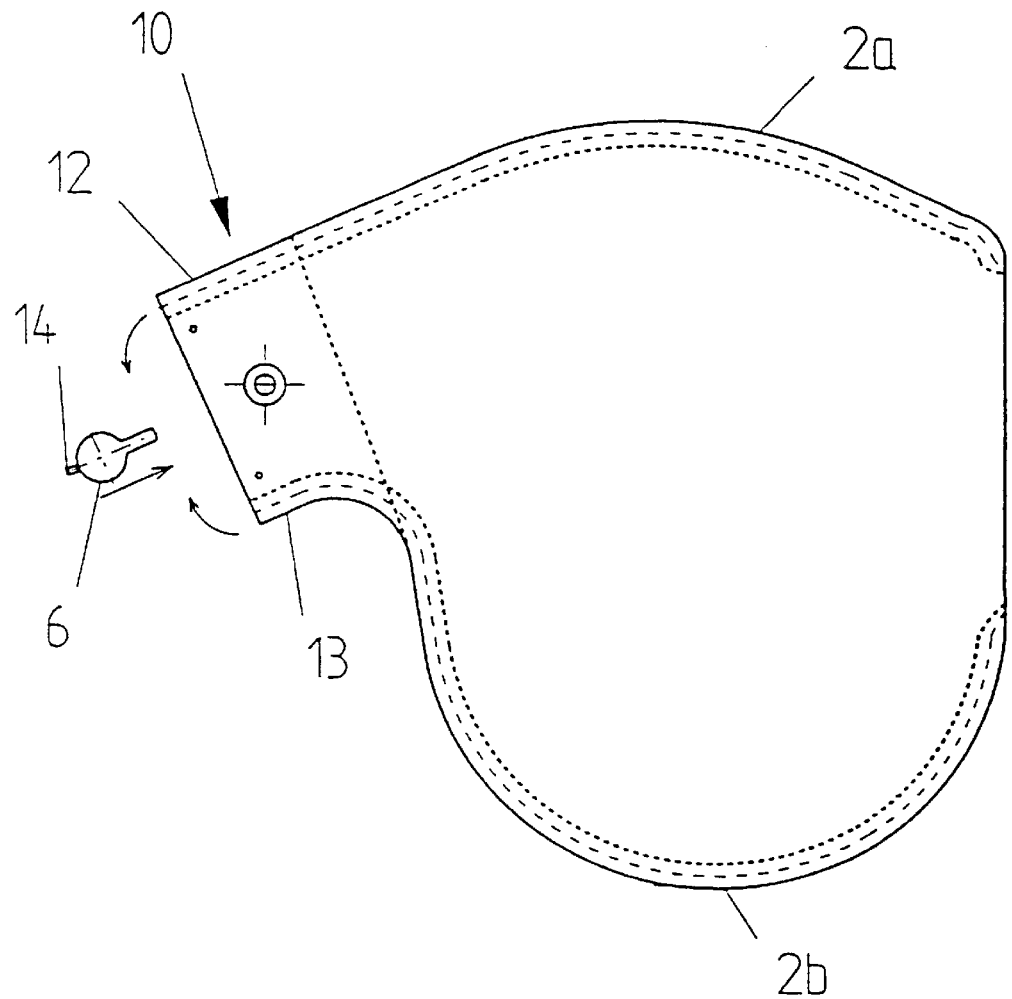
FIG. 2 shows an airbag manufactured from the airbag blank of FIG. 1, after it has been turned over.

A single-piece airbag blank according to the present invention has airbag sections 2, 3, and sections 4, 5, on both sides of a line of symmetry 1, for holding a diffuser 6, which extends around a tubular gas generator. Openings 7, 8 are provided to hold the diffuser 6 and openings 9 to secure it. It can be seen from FIG. 1 that edges 2a, 2b are curved. The edge 2a, which is situated at the top above the edge 2b after installing it in the airbag module, has a lesser curvature than the edge 2b bordering the airbag at the bottom.

Figure 3:
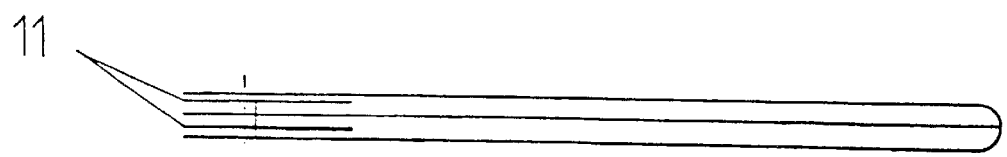
FIG. 3 shows the airbag according to FIG. 2 in section.

To produce the airbag, the airbag blank according to FIG. 1 is folded on the line of symmetry 1 and the congruent regions are sewn together along the edges 2a, 2b. The finished airbag now has a blow-in aperture 10 that remains open on one side for subsequently fitting the diffuser 6. In order to reinforce the blow-in aperture 10, fabric inserts 11 (FIG. 3) can be added when sewing up the congruent regions along the edges 2a, 2b. The inserts have identical holes to match the openings 7 to 9. During sewing, the fabric inserts are initially situated on the outside and after the airbag has been turned over, are situated on the inside, as is illustrated in FIG. 3.

In order to fit the diffuser 6 in the blow-in aperture 10, the latter is widened perpendicularly to the plane of projection and the diffuser is pushed in. The regions 12, 13 of the blow-in aperture 10 are then folded over in the arrow direction and the openings 9 slipped over threaded plugs 14 of the diffuser. After that, the gas generator, which is not illustrated, can be pushed through the opening 7 into the diffuser and the airbag can be fixed to the end sides of the diffuser via the openings 7, 8 by means of known securing means.

FIG. 4 illustrates the unfolding characteristics of a known, three-dimensional airbag. In this case, two side parts 15, 16 are connected to a circumferential central part 17 by seams 18, 19 (FIG. 5). In this airbag, the seams are situated to the sides of the central part, so that the region of the central part against which the occupant impacts following a crash is seam-free. The airbag is arranged in a "top-mounted" installation position in a dashboard 20 and unfolds between the latter and the windshield 21.

The same positive effect is also obtained with less complexity with the airbag cut and arranged according to the invention. In the case of this airbag, the seams of the edges 2a, 2b run away from the occupant in the center of the airbag, starting from the seamless region 22. In the case of the present arrangement according to the invention, the occupant likewise collides with the seamless region of the airbag although the seams run in the center of the airbag.

What is claimed is:

1. An airbag module having an airbag and a diffuser, wherein:
    the airbag comprises a single, flat blank having a first airbag section and a second airbag section on either sides of a line of symmetry, the first and second air bag sections having identical shape and size, the first and second airbag sections being connected along their edges to form first and second seams, and a seamless region extending between the first and second seams,
    the airbag has a holder that holds the diffuser,
    the airbag is arranged in the airbag module so that the airbag unfolds following a crash, with the first and second seams extending away from an occupant substantially along a vertical plane of the line of symmetry, starting from the seamless region of the airbag, with the seamless region of the airbag, whose height is determined by the line of symmetry, facing the occupant, and
    the first and second seams run along centrally of the airbag.

2. An airbag module according to claim 1, wherein the diffuser is adapted to surround a tubular gas generator and is arranged so that its longitudinal axis runs perpendicularly with respect to a plane in which the airbag deploys.

3. An airbag module according to claim 1 or 2, wherein the diffuser holder comprises first and second adjoining sections adjoining respectively from the first and second seams, the diffuser holder having an opening for receiving a gas generator, the diffuser holder being adapted for a top installation in a vehicle below a windshield.

4. An airbag module according to claim 1, wherein the first and second seams of the airbag are curved.

5. An airbag module according to claim 4, wherein the first seam is situated above the second seam upon the airbag unfolding, the first seam having a lesser curvature than the second seam, which is positioned bordering at a bottom of the airbag.

6. An airbag module according to claim 1, wherein the airbag has a single fold along the line of symmetry.

7. An airbag for a vehicle, comprising:
    a first airbag section and a second airbag section shaped and sized as the first airbag section, the first and second airbag sections extending on left and right sides from a line of symmetry,
    wherein the first and second airbag sections are integrally formed at the line of symmetry,
    wherein the first and second airbag sections are connected along their edges to form first and second seams, and a seamless region extending along the line of symmetry between the first and second seams,
    wherein the airbag is adapted to unfold with the first and second seams extending away from an occupant substantially along a vertical plane of the line of symmetry, starting from the seamless region of the airbag, and
    wherein the first and second seams run substantially along the vertical plane of the line of symmetry when the airbag unfolds, with the seamless region, whose height is determined by the line of symmetry facing the occupant.

8. An airbag according to claim 7, wherein the first and second sections have a single fold along the line of symmetry.

9. An airbag according to claim 7, wherein the first and second seams of the airbag are curved.

10. An airbag according to claim 9, wherein the first seam is situated above the second seam when the airbag unfolds, the first seam having a lesser curvature than the second seam, which is positioned bordering at a bottom of the airbag.

* * * * *